United States Patent [19]

Grose

[11] Patent Number: 4,470,770

[45] Date of Patent: Sep. 11, 1984

[54] WIND POWERED APPARATUS

[75] Inventor: David L. Grose, Wichita, Kans.

[73] Assignee: Solartech Energy and Research Corporation, Topeka, Kans.

[21] Appl. No.: 393,068

[22] Filed: Jun. 28, 1982

[51] Int. Cl.³ .......................... F04B 17/02; F03D 5/06
[52] U.S. Cl. ...................................... 417/334; 416/82; 416/83; 416/79
[58] Field of Search .................... 417/334; 416/79, 82, 416/83

[56] References Cited

U.S. PATENT DOCUMENTS

| | | | |
|---|---|---|---|
| 1,601,246 | 9/1926 | Frost | 416/82 |
| 2,465,285 | 3/1949 | Schwickerath | 416/83 |
| 3,952,723 | 4/1976 | Browning | 417/334 |

FOREIGN PATENT DOCUMENTS 2524145 12/1976 Fed. Rep. of Germany ........ 416/83

OTHER PUBLICATIONS

R. F. Porter, J. H. Brown, "Evaluation of Gust-Alleviation Characteristics and Handling Qualities of a Free Wing Aircraft", NASA CR-1523, 1970.

*Primary Examiner*—Richard E. Gluck
*Attorney, Agent, or Firm*—Robert E. Breidenthal

[57] ABSTRACT

An elevated and elongated boom is centrally pivoted for rocking movement in a vertical plane through the horizontal plane. Provision is made to align such plane with the direction of the wind. A pair of free wings are mounted on the fore and aft ends of the boom with control panels being oscullatably mounted on such wings for determining by their relative positions and aerodynamic equilibrium reaction thereto the angle of attack of such wings. Provision is made to control the relative positions of the control panels with respect to their respective wings so that the wings have angles of attack of opposite sense, with such senses being reversed as the boom approaches each predetermined limit of its rocking motion. Each wing and its control panel are preferably comprised of independent right and left sections that drive the vertical plane of the boom as a plane of symmetry, with the right and left control panels being controlled so the lift, upward or downward, contributions by the associated right and left wing sections to the boom are balanced. The fore (canard) and aft wings are positioned and sized relative to each other to equalize their moment contributions to the rocking motion of the boom. Alternative wing structures are disclosed with one construction involving the fore and aft wings being respectively forwardly and rearwardly swept in which case the need for independent right and left wing sections is deemed to be reduced. One wind construction involves stacked or vertical arrays of two or more wings at both the fore and aft ends of the boom. One embodiment, in distinction to the others, involves the control panels leading rather than trailing their respective panels in which event the direction of their control adjustment to effect a desired angle of attack is reversed. The rocking motion is applied to drive, by a wind velocity controlled stroke, a double-acting hydraulic pump disposed adjacent the pivot which may be coupled by depending hydraulic lines to additional energy transducers disposed on the ground of any desired type, e.g., hydraulic to electric, hydraulic to fluid flow in pipe lines, etc.

4 Claims, 10 Drawing Figures

WIND POWERED APPARATUS

The present invention relates to new and useful improvements in transducers that incorporate a wind driven oscillating member for converting wind energy into mechanical or electrical energy, and more particularly pertains to such transducers wherein the member is wind driven to oscillate by an essentially torsion-free wing having an angle of attack that varies as a function of the angular disposition of the driving member.

A great deal of effort has been and is currently being made to utilize wind energy by employing apparatus that includes blades or airfoils that extend radially from a rotatable hub, however, efforts to effect such energy extraction on a large scale have been rather disappointing to date for various reasons. unfortunately, improvement in results can probably be achieved slowly at best inasmuch as great difficulties arise on attempting large scaling of a diminutive project that may appear promising largely because no mature analytical methodology presently exists to accurately predict characteristics of a proposed design.

Among various reasons mitigating against large scale rotary wind driven apparatus may be mentioned; cyclic loads such as those arising from the gravity gradient and tower or supporting structure wake rapidly produce deliterious fatigue effects (hub fractures and the like); complex structures subject to high and varying stresses are required to control blade pitch; the occurrence of undesirable variations (which may possibly be of resonant nature) in blade pitch along the radial extent of the blade; gust loads require sophisticated design of expensive construction character; high susceptibility to ill effects arising from localized low frequency overpressure; high susceptibility aeroelastic problems; and poor public relations arising from such factors as the disruption of TV reception over a substantial area by reason of signal flutter due to reflections from rotating blades.

The present invention is the culmination of efforts made to effect a conversion of wind energy by means such as to avoid the difficulties of rotating blade structures given above and which could, insofar as possible, benefit in details of its design characteristics being susceptible to accurate prediction by virtue of the existence of mature analytical methodology therefor. Such a mature analytical methodology presently exists, for example, with respect to numerous aspects of aircraft design inclusive of control systems therefor.

As suggested above, the primary objective of the present invention is to provide a wind energy transducer that will not be based on a system of rotating blades or airfoils, and which could be largely based insofar as predictions of design characteristics on a mature aerospace technology.

Other important objects reside in providing a wind energy transducer that employs a winglike structure that can be of simple, essentially standard and therefor inexpensive construction cost; that in large measure utilizes standard or off the shelf components; that provides redundant loading paths at the location of greatest stress; that minimizes gust load problems; and which produces little or no TV interference, low frequency pressure gradients, or aeroelastic problems.

An appreciation of the background of the present invention can be obtained on inspecting the most pertinent prior art proposals known, such proposals being set forth in the following U.S. Pat. Nos.:

| | | |
|---|---|---|
| 4,184,805 | Arnold | January 22, 1980 |
| 3,995,972 | Nassar | December 7, 1976 |
| 2,465,285 | Schwickerath | March 22, 1949 |
| 1,302,889 | Albisu | May 6, 1919 |
| 1,281,618 | McGregor | October 15, 1918 |
| 1,221,090 | Prewitt, et al | April 3, 1917 |
| 276,939 | Trumble | May 1, 1883 |
| 258,650 | Howland | May 30, 1882 |
| 237,851 | Foskett | February 15, 1881 |
| 170,326 | Armour | November 23, 1875 |
| 148,927 | Chapin | March 24, 1874 |

Briefly, with respect to the prior art which is listed above, the Arnold patent discloses apparatus that includes provision of a rotary mount and rudder for orienting the same into the wind, and which extracts wind energy aeroelastically, i.e., by a plurality of fluttering airfoils.

The Nassar patent discloses an airfoil mounted for vertical reciprocation with means for mechanically changing the angle of attack upon reaching each of its limiting positions so as to be urged toward the other.

The Schwickerath patent discloses a wing mounted upon the aft end of a member mounted for vertical oscillation about a transverse pivot at its forward end of the member. Wind actuated means adjacent the pivot are provided for directly mechanically controlling the attitude of the wind relative to the oscillating member. The structure is such as to orient itself into the wind. The right and left wing sections are mechanically joined and are not independently controlled so as to avoid any rolling torque on the oscillating member.

The Albisu patent discloses a vertically oscillatable member having a wing or vane at its aft end. The angle of attack by the wing relative to the member or boom is limited between two extremes by structure carried by the member constituting physical constraints. The mounting of the wing on the member is such that the former is forced to one of such extremes by reason of the fact that the aerodynamic center of the resultant force is ahead of the wing rotation point, which causes the angle of attack to diverge until stopped by one of the physical constraints. It will be noted that sustained operation of the apparatus will require the moving parts to have sufficient inertia for the wing to pass through and beyond the position in which it supplies no lifting force vertically or downwardly to the oscillating member.

The McGregor patent discloses vertical arrays of lifting surfaces at the right and left ends of a centrally pivoted boom. Means are provided for mechanically reversing the angle of attack of the lifting surfaces upon their reaching limiting rocking positions of the oscillating member.

The Prewitt et al patent discloses structure generally similar to that of the Albisu patent except that a vertical array of lift surfaces is provided rather than a single lifting surface. Here again reliance must be had upon inertia of moving parts to carry the same through conditions when no lift is being effected.

The Trumble patent discloses structure generally similar to that of the Albisu patent, together with means enabling the limiting positions to be adjusted during operation from a remote location by an attendant.

The Foskett patent discloses apparatus that is generally similar in principle to the structure disclosed in the Albisu patent, differing primarily in the character of the physical constraint provided.

The Chapin patent discloses a centrally pivoted, vertically oscillating member provided with lift surfaces at both its forward and aft ends. A control system is provided such that only one of such surfaces is active at one time, rather than such as to cause one of such surfaces to produce an upward force while the other produces a downward force.

For reasons subsequently to become apparent, it may be noted with respect to the above patents that none of the disclosed structures employs a canard-wing approach, i.e., fore and aft wings concurrently producing complementary forces. Furthermore none of the patented constructions employs the torsionally-free wing concept that has been developed for gust load alleviation in aircraft. It will also be noted that none of the patented constructions operates to independently control wings as to its angle of attack dependent upon only the aerodynamic conditions experienced by that particular wing at any moment in time. In the same vein it will be noted that none of the patented constructions independently control the right and left portions of a centrally mounted wing.

It will be noted that the wings or lifting surfaces of all the patented constructions are mechanically manipulated as to their angle of attack, and do not operate in the manner of a torsionally-free wing which only rotates a control surface and utilizes resulting aerodynamic forces to alter the angle of attack of the wing proper.

An additional appreciation of the prior art will be obtained on reference to a publication of the National Aeronautics and Space Administration (NASA CR-1523), entitled Evaluation of the Gust-Alleviation Characteristics and Handling Qualities of a Free-Wing Aircraft, by Richard F. Porter and Joe H. Brown, Jr., the disclosure of which is incorporated herein by reference.

A broad aspect of the invention involves in wind powered apparatus, an elongated boom mounted for pivotal movement about a horizontal and transverse boom axis in an arrangement such that the boom can oscillate in a vertical plane between limiting positions, with a transversely extending airfoil being pivotally mounted on the boom about an airfoil axis longitudinally spaced from the boom axis for movement between positive and negative attitudes relative to the boom operatively subjecting the boom to oppositely directed moments in response to wind induced airfoil lift forces, whereby the boom can be caused to oscillate between its limiting positions by alternately urging pivotal movement of the airfoil toward its positive and negative attitudes. Means are provided for alternately urging the airfoil toward its positive and negative attitudes in synchronism with the boom alternately attaining its limiting positions, with such means including a control surface mounted on said airfoil for movement between positive and negative positions operative to subject the airfoil to oppositely directed moments about its pivotal axis in response to ambient wind. The airfoil having a center of lift disposed rearwardly of the airfoil mounting axis in an arrangement such that lift forces subject the airfoil to a moment urging pivotal movement to the airfoil in a direction that reduces the angle of attack productive of such lift, whereby the airfoil is urged to an equilibrium position that balances the moments effected by the control surface and lift forces, and energy transducer means operated by oscillatory motion of the boom.

Another broad aspect of the invention has to do with apparatus for extracting energy from a moving fluid of the class that includes an elongated member mounted for rocking movement between limiting positions about a pivot and a wing mounted on the member for relative movement thereon between positive and negative angles of attack with respect to ambient fluid flow for alternately urging pivotal movement of the member in one direction and then in the opposite direction. The improvement comprises said wing being mounted on the member for free oscillatory movement about an axis normal to the plane of rocking movement of the member and a control panel pivotally mounted thereon for movement between first and second positions that are respectively operative to subject the wing to oppositely directed moments about its oscillatory axis whereby the wing is urged respectively toward positive and negative angles of attack in response to the control panel being disposed at its first and second positions. Control means are provided for moving the control panel from one of its positions to its other position in response to the wing moving to each of its limiting positions whereby the direction of rocking movement is reversed.

Another aspect of the invention has to do with the preceding aspect, wherein the wing includes a pair of independently oscillatable wing sections having the plane of rocking movement as a plane of symmetry, and wherein the control panel includes a pair of independent control panel sections respectively associated with the wing sections, and wherein the control means is operative to effect a differential relative positioning of the control panel sections with respect to their associated wing sections to equalize the forces applied to the member by the wing sections in response to a sensing of a force differential.

An important feature of the invention resides in the provision of oppositely and concurrently operating lifting surfaces positioned and sized to effect essentially equal moments urging the desired teeter-totter or vertical rocking movement of the boom or beam.

Another important feature of the invention is the torsion-free mounting of the lifting surfaces or airfoils such that the angle of attack thereof is that which effects and equilibrium with the aerodynamic forces resulting from controlled movements of a control surface mounted on the airfoil.

Yet another important feature of the invention is the coordinated movements of the control surfaces of the right and left portions of a wing so as to minimize any roll moment applied to the boom on which the airfoil or wing is mounted.

Other objects, features and advantages of the invention will become apparent during the ensuing description of preferred embodiments of the invention, such description being given in conjunction with the accompanying drawings illustrative thereof, wherein:

Referring now to the drawings wherein like numerals designate like parts throughout the various views, and with attention being initially directed to the form of the invention shown in FIGS. 1 through 7 inclusive, the reference numeral 10 designates the wind energy transducer generally, the same being comprised of a sturdy, ground based vertical mast or tower 12 having a lower base portion 13 suited for any conventional mounting on the ground so that the tower 12 extends to a substantial height at which a support 14 is mounted thereon for free rotation about the vertical axis of the tower 12. An elongated beam or boom 16 is, intermediate its ends, pivotally mounted by a pivot or trunnion 18 for rocking or oscillary movement about a movable horizontal axis defined by the pivot 18 that is perpendicular to the longitudinal extent of the boom 16.

Figure 1:
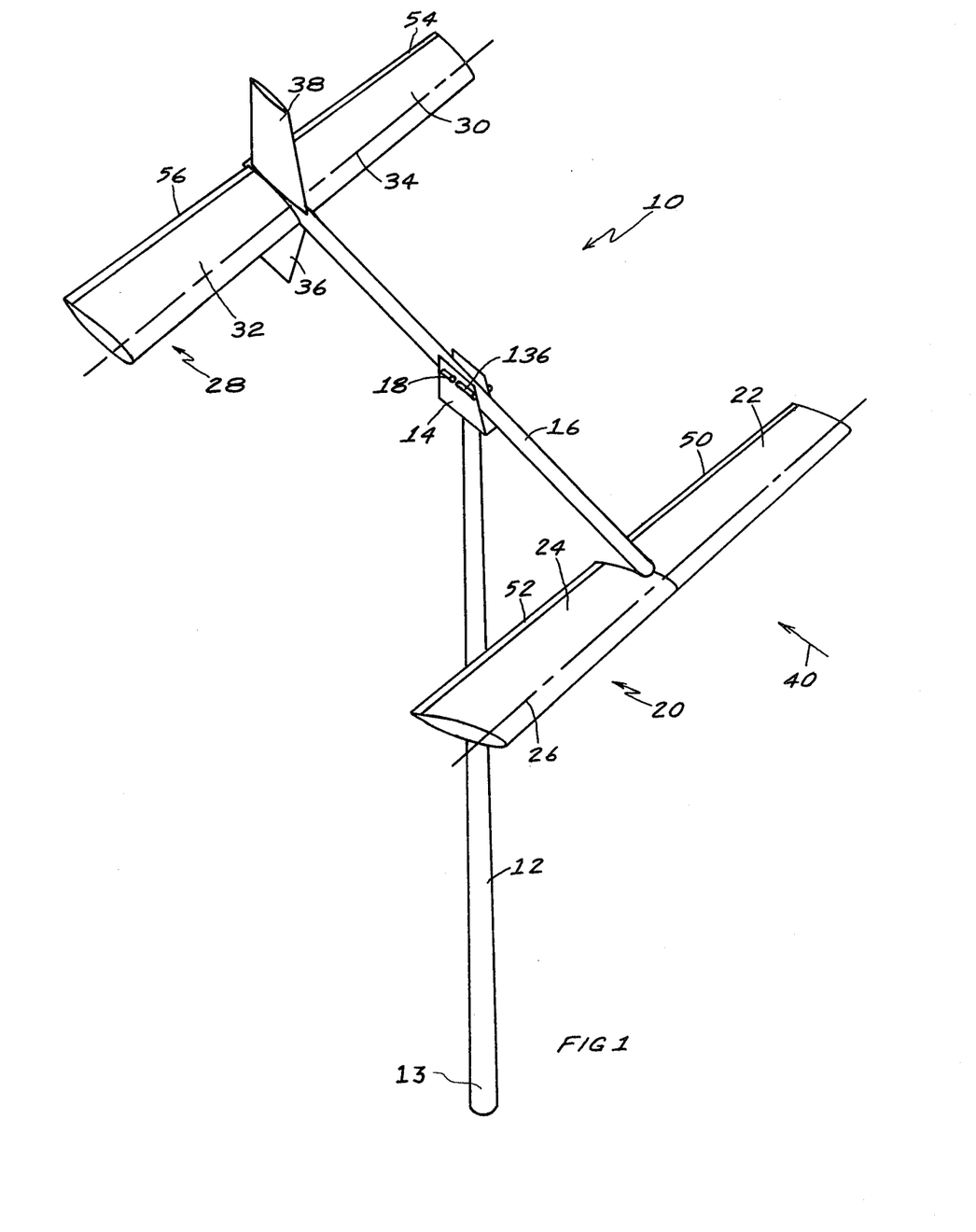
FIG. 1 is an oblique view of the wind pump or energy transducer taken from above and right front of the same.
Figure 2:
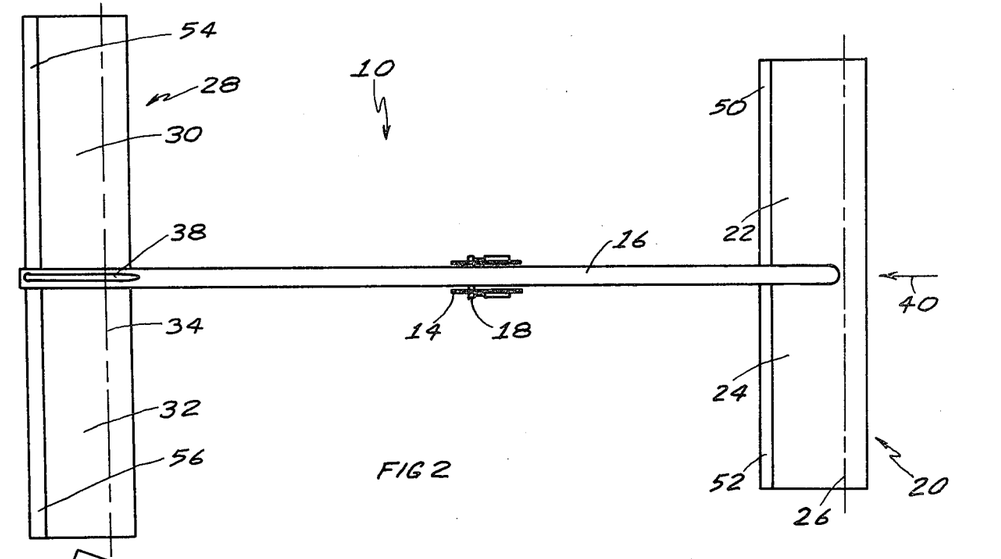
FIG. 2 is a top plan view of the apparatus shown in FIG. 1.

A forward wing or canard 20 is mounted on the forward end of the boom 16 to extend transversely to the same. The horizontally extending airfoil or wing 20 is comprised of independent left 22 and right 24 panels that are mirror images of each other and are each rotatably mounted on a pivot or axle means, not shown, fixed to the boom 16 in an arrangement such that the airfoils or wing panels 22 and 24 are free to rotate about aligned axes indicated by the dashed line 26 that is horizontally disposed and perpendicular to the boom 16.

A rear wing or airfoil 28 is mounted at the rear or trailing end of the boom 16, and like the canard 20, the wing 28 is comprised of a pair of independent panels or sections 30 and 32 respectively disposed on the left and right sides of the boom 16. The airfoil sections 30 and 32 are mounted on the boom 16 for free rotation about a common axis indicated by the dashed line 34. Such axis is disposed horizontally and is perpendicular to the extent of the boom 16.

A pair of vanes or steering fins 36 and 38 are fixed to the rear end portions of the boom 16 intermediate the wing sections 30 and 32. The fins 36 and 38 are coplanar and lie in a vertical plane coincident with the extent of the boom 16, with the fins being essentially mirror images of each other with the fins 36 and 38 respectively extending below and above both the boom 16 and the wing 28. Manifestly, the fin arrangement is such that the winged boom 16 will weather vane into the wind indicated by the arrow 40 so as to present the forward or canard end of the boom 16 directly into the wind 40. Accordingly, the wings 20 and 28 may be respectfully termed windward and leeward wings.

Figure 3:
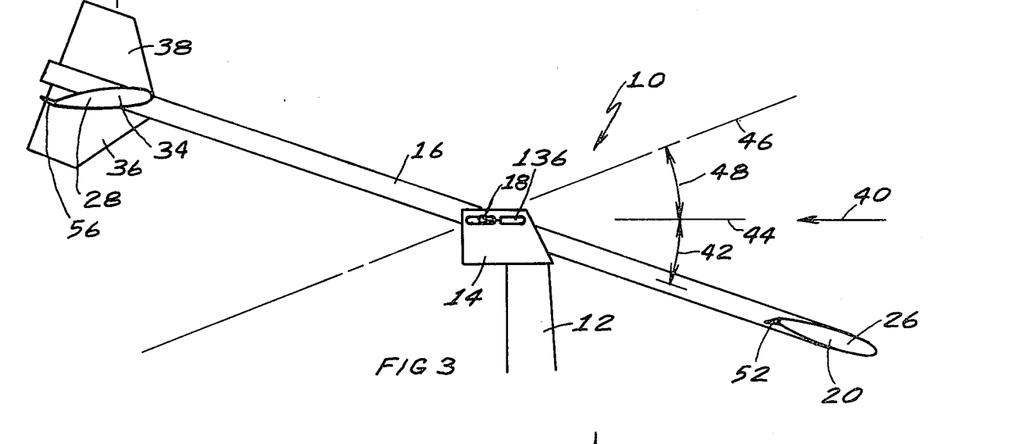
FIG. 3 is a broken side elevational view of the wind pump with the boom being shown in its extreme nose rocked down position, and with its extreme nose rocked up position being indicated by a dashed line.

As thus far described it will be evident that, as shown in FIG. 3, the boom 16 can rock or oscillate vertically between limiting positions such as the one shown with the boom 16 being directed forwardly and downwardly at an angle 42 below the horizontal and a position indicated in dashed line at 46 that is an angle 48 above the horizontal 44. Preferably the angles 42 and 48 are equal. While physical stops can be mounted on the tower 12 to physically set the rocking limits if deemed desirable or expedient, it is preferred that such limits be realized during operation by controlling the lift forces effected by the wings 20 and 28 in a manner that will be presently set forth.

To effect control of the wings 20 and 28, control surfaces or panels 50, 52, 54 and 56 are respectively hingedly connected to the wing sections 22, 24, 30 and 32 to trail the latter as shown.

Figure 4:
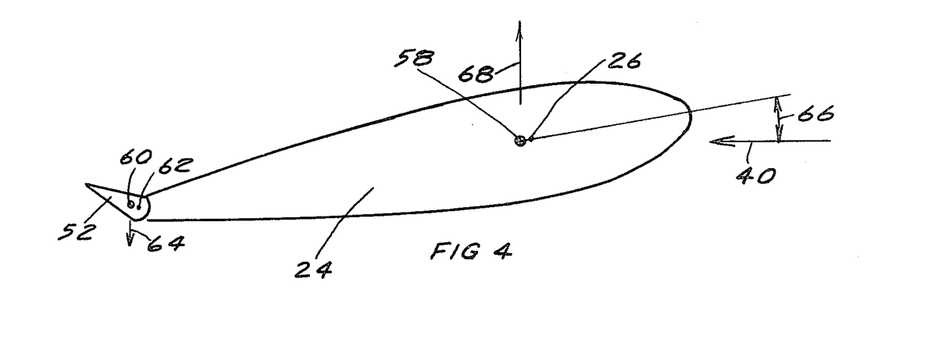
FIG. 4 is a diagrammatic illustration of a torsion-free wing section and shows the relationship of the aerodynamic center of the wing or airfoil to the axis of its rotatable mounting as well as the relationship of the aerodynamic center of the trailing control surface to the axis of its hinged attachment to the airfoil.

The torsion-free mode of wing operation will be readily appreciated on reference to the previously cited NASA publication the essence of which is illustrated in FIG. 4. As both wings 20 and 28 are torsion-free lift devices, a description of such mode with respect to only one wing section and its control surface will suffice for all. Accordingly, such description is given with respect to wing section 24 and its control surface 52 in FIG. 4.

The reference numerals 58 and 60 respectively designate the aerodynamic centers of the wing sections 24 and the control surface or panel 52. It will be noted that the aerodynamic center 58 both trails and is in close but spaced relationship to the pivotal axis 26 of the wing section 24. In a similar fashion the aerodynamic center of the control panel 52 trails the axis 62 of its hinge connection to the wing section 24.

The operation of the structure shown in FIG. 4 is such that if, by means not shown, the control panel or surface 52 is caused to be inclined with respect to the wing section 24 as shown, the wind 40 will be acted upon in such a manner that will result in a small downward force 64 operative at the center 60 that produces a pitching moment about the axis 26 that causes the lifting surface or wing section 24 to rotate to an angle of attack indicated at 66. The resultant lifting force 68 that acts at the aerodynamic center 58 that results in a moment about the closely spaced axis 26 that opposes and at an equilibrium established by the angle of attack 66 counterbalances the moment produced by the control panel 52 about the axis 26. The net result is that the wing section 24 exerts an upward force on the boom 16 at its point of attachment. As long as the wind continues to blow and after any wind interruption, such lift will be provided if the orientation of the panel 52 relative to the wing section 24 remains the same. It is thought that it will be manifest to those skilled in the art that if the orientation of the control panel 52 is reversed with respect to the wing section 24, the net result will be a negative angle of attack and the application of a downward force on the boom 16 by the wing section 24.

Means will now be described for effecting a reversal of the orientation of the control panels upon the boom 16 reaching its limiting positions, and for this purpose attention is directed to FIGS. 6 and 7.

A pivot rod or bar 70 is mounted on the turret or mounting structure 14 for oscillation about the pivot 18, with the lower end of the bar 70 being connected by a coiled tension spring 72 to the upper end of an upstanding arm 74 that is fixed to the boom 16 for rocking movement therewith. Appropriate stops, not shown, limit the oscillatory freedom of the bar 70 to equal displacements on opposite sides of the vertical, with the bar 70 being shown in one of such positions in FIG. 6 wherein the upper end of the bar 70 being disposed rearwardly of the pivot 18 with respect to the boom 16. It will be readily apparent that when the bar 70 is disposed at its other limited position, the upper end of the bar will be forwardly of the pivot 18 with respect to the boom 16.

Figure 6:
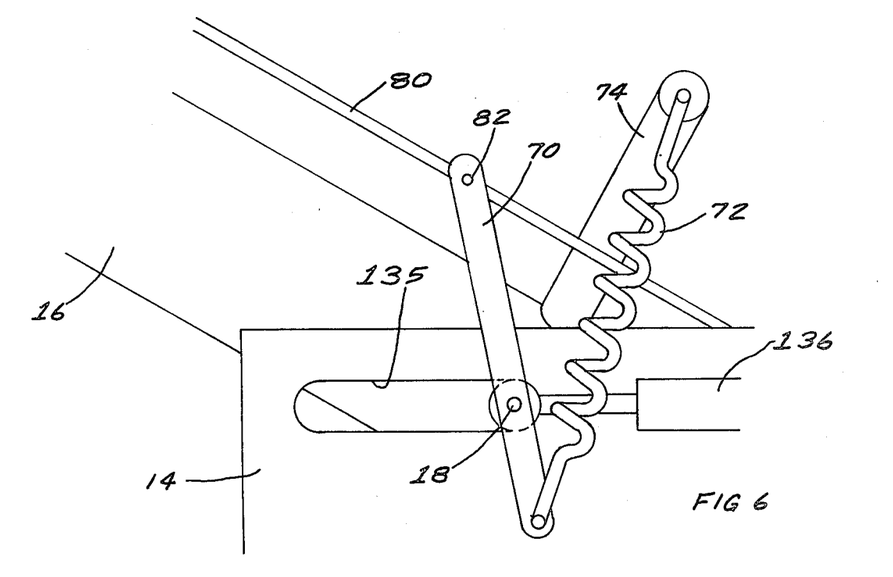
FIG. 6 is an enlarged fragmentary view of structure associated with the pivotal mounting of the boom for effecting a longitudinal shift in the position of a control linkage upon each occurrence of the boom attaining one of its extreme rocking positions.

It will be evident upon persual of FIG. 6 that anti-clockwise movement of the boom 16 and the arm 74 will initially increase the tension of the spring 72 until after the line of action has moved an interval to the left of the pivot 18 after which the spring 72 causes the bar 70 to snap to its other limited position in which it will remain until clockwise motion has moved the line of action an interval to the right of the pivot 18. Accordingly, the bar 70 is essentially in one or the other of its limited positions and will snap from one to the other upon the boom 16 being rocked through and beyond a horizontal attitude a predetermined angular interval that approximates the angles 42 and 48 shown in FIG. 3.

A control rod 80 is mounted atop the boom 16 by any suitable means, not shown, for essentially endwise movement parallel to the extent of the boom 16, and such rod 80 is pivotally connected at 82 to the upper end of the bar 70 in an arrangement such that endwise movement fore and aft of the control rod 80 is effected upon the bar 70 being snapped to its limited positions.

The position of the control rod 80 is applied at its forward end to move the control panels 50 and 52 of the wing or canard 20, and is applied at its rear end to move the control panels 54 and 56 of the rear or trailing wing 28. Inasmuch as the operative connections at the forward and aft end of the rod 80 to the control panels are generally similar and identical in principle, illustration and description of only one of such operative connections will suffice for both.

Figures 7, 8:
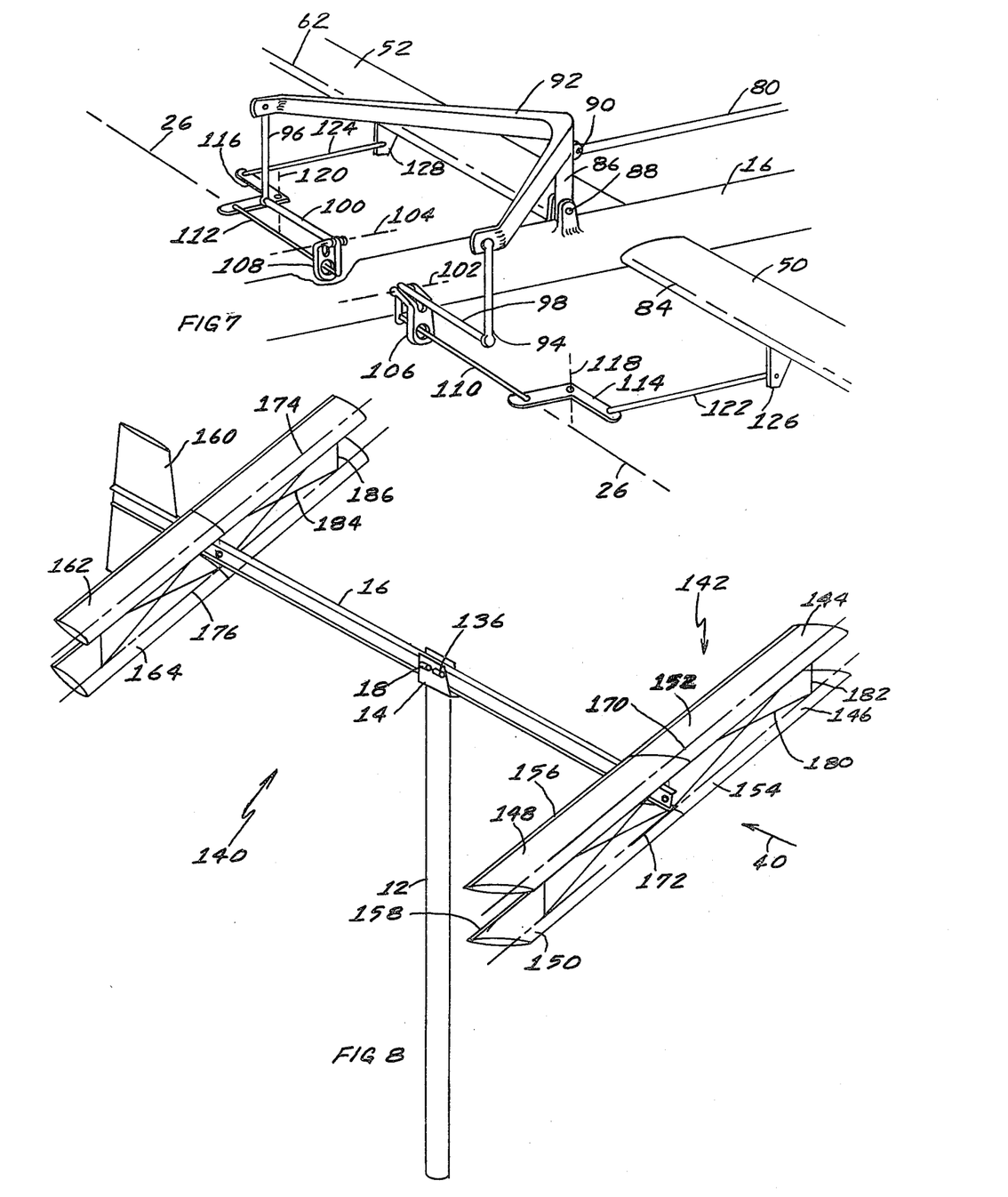
FIG. 7 is an enlarged and fragmentary oblique view that is somewhat diagrammatic in character with parts removed to illustrate the operative relationship of the control linkage of FIG. 6 to the control surfaces of the right and left sections of an airfoil.
FIG. 8 is of the same general nature as FIG. 1, and illustrates a modification such that multiplane lifting surfaces are provided at both the fore and aft ends of the boom.

Accordingly, and with reference to FIG. 7 which shows the operative connection of the forward end of the control rod 80 to the panels 50 and 52, it will be noted that the panel 50 has its hinged connection to the wing panel 22 (deleted in this view) along an axis indicated at 84. The aerodynamic center of the control panel 50 bears the same relation to the axis 84 as previously given with respect to the aerodynamic center 60 of the panel 52 and the axis 62.

An upstanding post 86 is pivoted at its lower end at 88 to the boom 16 for swinging movement in the vertical medial plane of the boom 16, with such swinging movement being effected by the forward end of the rod 80 being pivoted thereto at 90.

A yoke 92 is on the upper end of the post 86 and the forwardly projecting arms of the yoke 92 are connected by depending links 94 and 96 respectively, as shown, to the control arms 98 and 100 that in turn respectively have their bight portions pivoted at 102 and 104 respectively by means of the supports 106 and 108 respectively which are attached to the ends of the wing sections 22 and 24 and are free to rotate about the axis 26 of the rotary wing mountings. The other ends of the control arms 98 and 100 are respectively connected by links 110 and 112 to the bell cranks 114 and 116 respectively which allows links 110 and 112 to align themselves along the axis 26 of the wing sections 22 and 24. Bell cranks 114 and 116, whose bight portions pivot about fixed vertical axes 118 and 120 respectively, are connected by links 122 and 124 to tabs 126 and 128 fixed to the control panels 50 and 52 in a corresponding direction relative to their associated wing panels. It will be noted that the positions of the control panels 50 and 52 need not be equal by reason of the yoke 92 functioning as a balance, so to speak, whereby the moments aerodynamically encountered by the control panels are balanced. Such balancing of such moments in turn causes the associated wing panels 22 and 24 to assume equilibrium angles of attack that are productive of indirectly balanced moments with the consequence that the net torque applied to the boom 16 about its longitudinal axis is essentially zero or of very low amount.

Noting that the longitudinal shift of the control rod 80 is sufficient to cause on snap action, so to speak, of the bar 80, a reversal of the previous angles of attack of the wings 20 and 28, and noting further that such angles of attack of the wings 20 and 28 of opposite sense, the operation of the apparatus 10 as thus far described will be quite easily understood.

The bar 70 will have an initial position which will correspond to the wings 20 and 28 having opposite angles of attack relative to any existing wind such as to result in the boom 16 being urged toward one of its limiting positions. The boom 16 will eventually attain such limiting position within a time dependent upon the amount of wind encountered. Inasmuch as the boom 16 and the wings 20 and 28 are preferably sized and weighted so as to be statically balanced, the boom 16 may be motionless during intervals of calm as though awaiting the next breeze, which when it somes will cause the azimuth of the boom 16 to change to face thereinto as well as resumption of movement of the same toward its limiting position. Upon attaining such limited position, the bar 70 trips and the control rod 80 then causes reversal of the angles of attack by the wings 20 and 28. On such reversal of angles of attack, the wings 20 and 28 coact to drive the boom 16 to its other limiting position to result in another reversal and so on, ad infinitum.

Figure 5:
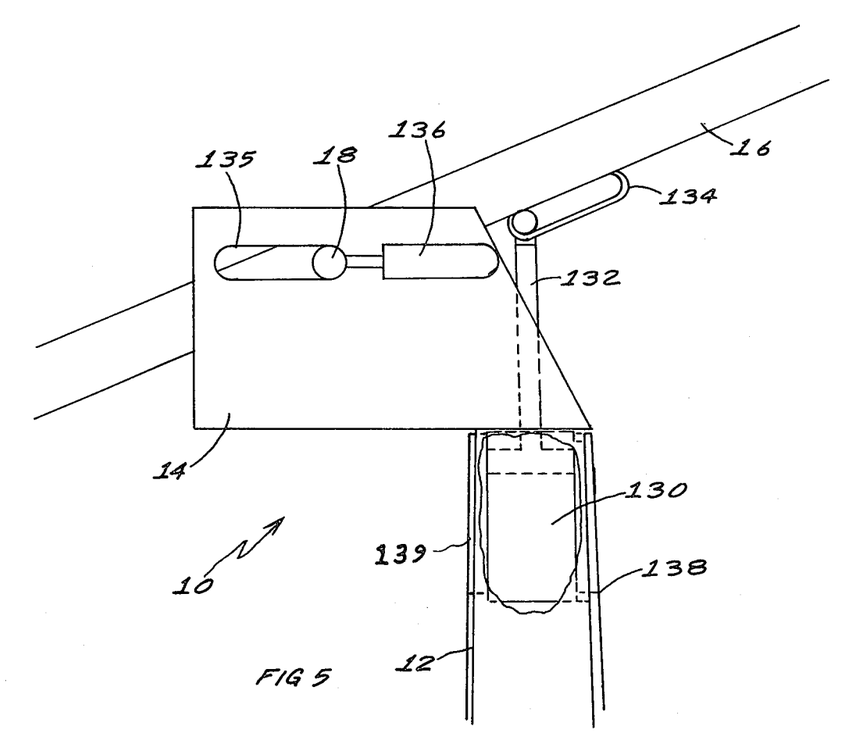
FIG. 5 is an enlarged fragmentary view of rotatable and pivotal mounting of the boom atop the mast or tower, and illustrates structure by means of which the rocking or oscillatory movement of the boom actuates a hydraulic pump means disposed within the uppermost portion of the tower.

While the rocking motion of the boom 16 can be applied to do mechanical and electrical work by a wide variety of means such as by using a pawl to effect intermittent unidirectional rotation of a toothed wheel, etc., or by using the same as essentially a jack in operating a down hole oil well pump through the agency of sucker rods, and so on, attention is directed to FIG. 5 for an appreciation of a preferred economical and versatile means for harnessing the rocking motion of the boom 16.

A reciprocating double-acting type of hydraulic or pneumatic pumping cylinder 130 is mounted adjacent and preferably within the upper portion of the tower 12 as shown with the piston rod 132 projecting vertically and upwardly therefrom. The upper end of the piston rod 132 is constrained in tension and compression by the slotted bracket 134 connected to the boom 16, whereby forceful vertical reciprocation of the piston rod 132, which is free to rotate about its own longitudinal axis to accommodate weathervaning of the boom 16 and its support 14, is effected upon rocking motion of the boom 16 actuated by the wings 20 and 28 between the limiting positions of the boom 16.

A variation in stroke length of the reciprocating pump is automatically effected by an increase in wind speed by means of the boom pivot 18 or trunnions (where fixed to the boom 16) being constrained in slotted guide openings 135 in its U-shaped support 14. As wind speed increases the aerodynamic drag produced by the wings 20 and 28 will increase proportionally in a manner to cause downwind movement of the pivot or trunnions 18 in the slotted support 14 the action of a tension spring and dashpot unit 136 that is fixed to the support 14 for urging the pivot 18 to the right as viewed in FIG. 5. Spurious or brief variations in wind velocity changes will not result in appreciable movement of the pivot 18 in the slotted support 14 because of the dampening action of the spring and dashpot combination 136.

The arrangement is such that the trunnions 18 tend to occupy a position in the slots 135 that is a function of the wind velocity arranged over a fairly long time constant. It will be readily apparent that the length of the stroke of the piston rod 132 increases with movement of the trunnions 18 to the left as viewed in FIG. 5 for a given angular oscillation of the boom 16. Thus the length of the stroke of the piston rod 132 increases with an increase in average wind velocity, and vice versa.

Accordingly, when the average wind velocity decreases, the spring tension in the dashpot 136 pulls the boom 16 upwind thus reducing the effective stroke of the reciprocating pump 130 and likewise an increased wind speed producing more aerodynamic drag on wings 20 and 28 will result in an increase in stroke of the pump 130. This mechanism to vary the pump stroke with wind speed allows a constant pump pressure to be produced at various flow rates which are established by the prevailing wind speed.

The hydraulic pump 130 effects closed circuit hydraulic fluid circulation through ground surface positioned hydraulically powered motors or the like, not shown, through hydraulic lines 138 and 139 respectively connected, as shown, to upper and lower portions of the cylinder 130 in a conventional manner. The hydraulic fluid employed should be selected to be appropriate to anticipated ambient temperatures while minimizing viscous fluid losses by using hydraulic lines 138 of adequate diameter.

Attention is now directed to FIG. 8 wherein there is shown a modified wing construction. In this apparatus designated generally at 140, the canard 20 at the forward end of the boom 16 is replaced by a canard 142 that is comprised of a pair of vertically spaced upper and lower wings 144 and 146 that are respectively comprised of right wing sections 148 and 150 and of left wing sections 152 and 154. The independent right wing sections 148 and 150 are free wings and controlled as to their angles of attack by control panels 156 and 158 respectively. The left wing sections 152 and 154 as well as their control panels are free-wings and mirror images of their right wing counterparts. Control means, not shown, but of a similar nature to those described in connection with the machine 10, are provided to control the components of the canard 142 to effect a net upwardly or net downwardly lift to the forward end of the boom 16.

A vertical fin 160 is fixed to the trailing end of the boom 16 in lieu of the fins 36 and 38 to direct the canard 142 into the wind 40 as shown. The rear portion of the boom is provided with a pair of vertically spaced wings 162 and 164 in lieu of the wing 28. Each of the wings 162 and 164 and the control panels thereof are generally similar to the corresponding parts of the wing they replace. As in the case of the canard 142, all the wing sections of the wings 162 and 164 are free wings and the control panels thereof are operatively interconnected with the attack angle controls of the canard 142 in a manner generally analogous to the arrangement in the machine 10 so that the trailing wings 162 and 164 have angles of attack opposite to the sense of the angles of attack by the canard 142 with the control means, not shown, reversing such sense upon the boom 16 moving to its limiting positions.

While the attack of individual wing sections of the canard are largely independent, it will be noted that such attack angle changes of the wings 144 and 146 respectively occur about aligned axes designated at 170 and 172. Similarly, both sections of the wing 162 rotate about an axis 174 and both sections of the wing 164 rotate about an axis 176.

The operation of the machine 140 is essentially the same as that previously described in connection with the machine 10. The machine 140 enables an increased efficiency in space utilization insofar as machine radius in the horizontal plane is concerned. The structure also enables a conservation in the use of materials as the upper and lower wings can be interconnected if desired by cross bracing in the nature of cross bracing that has been customary in biplanes such as the Stearman PT-13. The use of an amount of material necessary for strictly cantilever construction can be lessened by the effective thickness of the overall vertically connected structure. The optional cross bracing of the canard is suggested at 180 and 182, and the optional cross bracing of the wings 162 and 164 is suggested at 184 and 186.

Figure 9:
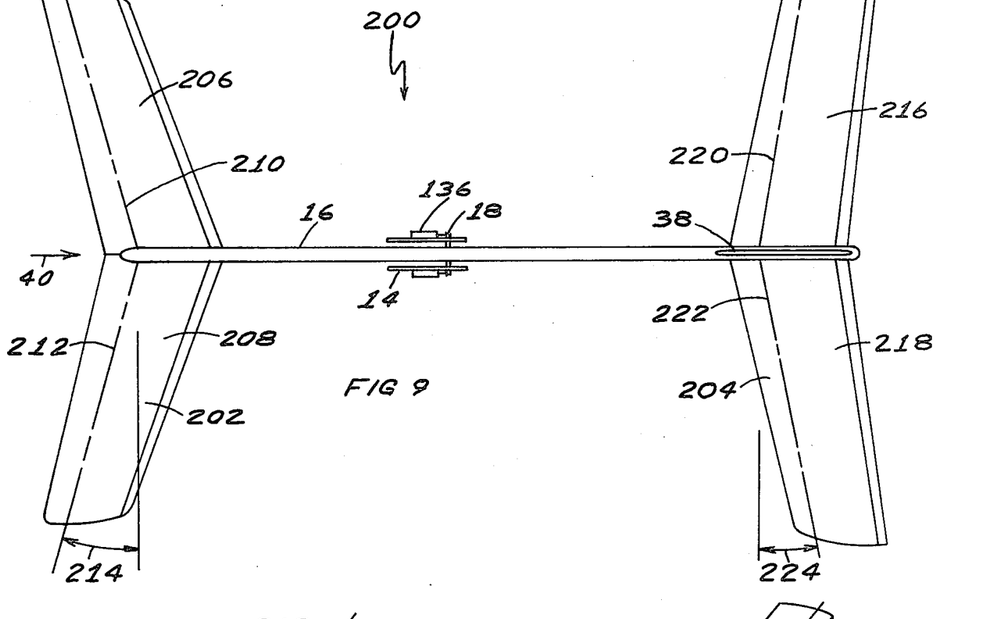
FIG. 9 is a top plan view of yet another modification of the structure shown in FIGS. 1–7 in that the forward wing or canard is forwardly swept while the rear or trailing wing is rearwardly swept; and, FIG. 10 is a view of the same general nature as FIGS. 1 and 9 and illustrates still another modification in that the control surfaces are in leading rather than in trailing relation to their respective airfoils.

Attention is now directed to the modified form of the invention shown in FIG. 9 and designated generally at 200. The machine 200 differs from the machine 10 substantially solely by the substitution of the wings 202 and 204 for the wings 20 and 28.

The wing 202 differs substantially solely from the wing 20 by reason of its right and left sections 206 and 208 being swept forwardly as shown and with the pivotal axes 210 and 212. Similarly, the wing 204 differs substantially solely from the wing 28 by being swept rearwardly with the right and left sections 216 and 218 thereof being mounted for rotation on rear swept and nonaligned axes 220 and 222, respectively. The axes are swept back rearwardly by an angle designated at 224 in FIG. 9.

When wind disturbances are encountered with the configuration shown in FIG. 9 so as to tend to longitudinally twist the boom 16, a nonlevel or tilting of the resultant forces will occur. Since one of the lifting surfaces is producing a tilted downward force, and the other an upward tilted force, their respective horizontal components will produce a moment which aids the vertical fin 36 and 38 in producing directional motion of the support boom or beam 16 about the axis of the boom 16 by reorienting the latter with respect to the prevailing wind conditions.

Except as described above, the control and operation of the machine 200 is essentially as that previously given in connection with the wind apparatus 10.

All the forms of the invention as thus far described involve control panels that are in trailing relation with respect to the airfoils to which they are hingedly connected.

Figure 10:
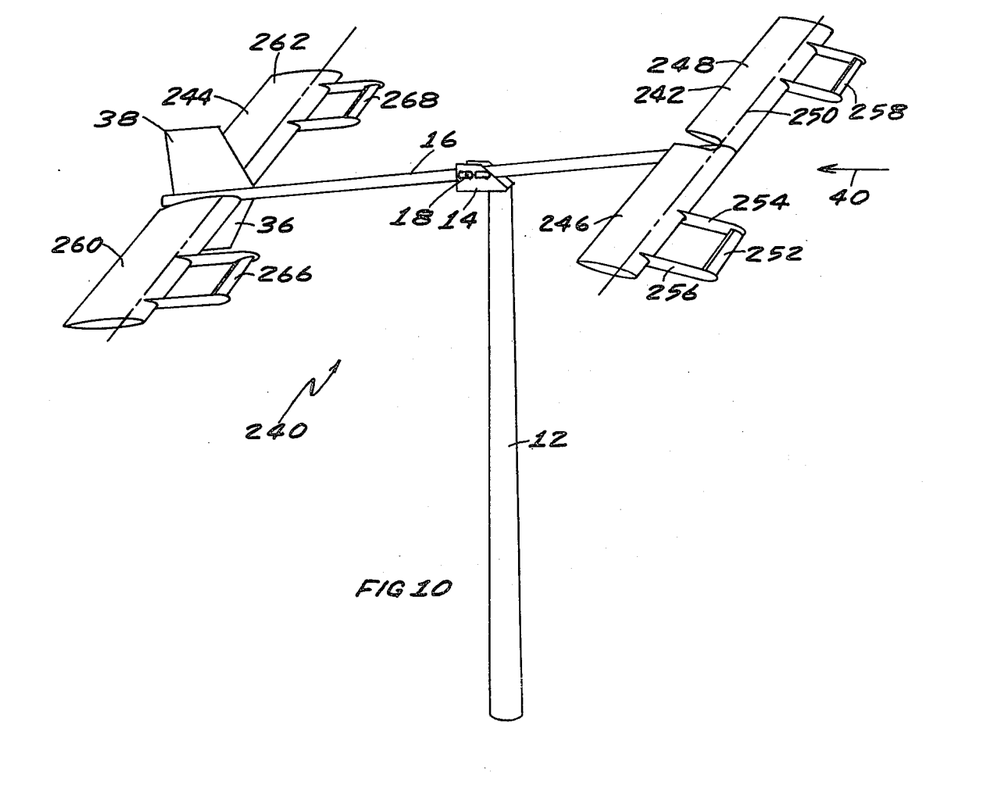

Such a relationship is not essential and attention is now directed to FIG. 10 wherein a wind apparatus 240 is disclosed wherein the control panels are in leading position in relation to the wings or airfoils to which they are connected. The machine 240 differs from the previously described machine 10 substantially solely by the respective substitution of wings 242 and 244 for the wings 20 and 28. The wing 242 has independent right and left sections 246 and 248 that are independently rotatably mounted at the forward end of the boom 16 for rotation about aligned axes 250. The wing section 246 is provided with a control panel 252 that is disposed forwardly of the wing section 246 and extends between the forward ends of forwardly extending support arms 254 and 256 that are fixed to the wing section 246. The panel 252 is pivotally connected to arms 254 and 256 for oscillation about an axis parallel to the axes 250. In a similar fashion the wing section 248 is provided with an oscillatable control panel 258.

The rear wing 244 comprises separate right and left sections 260 and 262 mounted for independent rotation about aligned axes 264. In a manner analogous to that set forth in connection with the wing or canard 242, the wing sections 260 and 262 are provided with leading oscillatably mounted control panels 266 and 268, respectively. As will be evident to those skilled in the art the operation of the machine 240 and its control will be readily understood especially in the light of the descriptions given above in connection with the other embodiments of the invention.

The only significant difference in the operation and control of the machine 240 resides in the fact that the direction or sense of the deflection of the control panels is opposite to that which is applied to give a desired sense of angle of attack in the previously described embodiments of the invention. It is deemed well within the skill of those modestly conversant with the art to couple the control rod 80 to the control panels so as to effect a reversal of the direction of control panel movement for a given direction of control rod 80 shift signalling the boom 16 having attained a limiting position. Accordingly, illustration and description thereof is omitted as the same would only serve to obfuscate the true inovativeness of the instant developments.

It will be abundantly clear to those of aerospace industry that many other extant schemes, both electrical and mechanical, can be readily applied to sense the boom attaining a limiting position and in response thereto effect a reversal in the attitude of the control panels such as result in movement of the boom 16 in the opposite direction.

Accordingly, having fully described the construction, operation, control and utilization of the instant invention, attention is now directed to the appended claims for an understanding of the actual scope of the invention.

I claim:

1. Wind powered apparatus comprising an elongated boom mounted for oscillation about a horizontal boom axis transverse thereto intermediate its ends, horizontally extending windward and leeward airfoils transversely mounted on said boom on opposite sides of said axis, each of said airfoils being mounted on the boom for movement between first and second attitudes relative to the boom respectively productive of wind induced lift urging pivotal boom movement about its axis in a first direction and a second direction opposite thereto, control means operative to move said airfoils in relation to movement of said boom to sustain oscillating movement of the latter between its limiting positions, said control means including means operatively connecting the airfoils to synchronize their movements toward their respective first and second attitudes, whereby the moments effected upon the boom by the lift of the airfoils are additive, energy transducer means driven by oscillatory movement of the boom, with the relative sizes and spacings of the airfoils being such that the moments effected upon the boom by the airfoils are approximately equal in magnitude, the mounting of the boom for oscillation comprises a tower adapted to be ground based so that the tower extends to an elevated position, a boom mounting head pivotally mounted on the top of the tower for rotation about a vertical axis, boom pivot means having a horizontal axis connecting the boom to the head, with a vertical fin fixed to the boom adjacent the leeward wing for urging the boom about the vertical axis into the wind with the windward airfoil forwardmost into the wind, said energy transducer means being a double-acting hydraulic pump including a cylinder and attached hydraulic lines fixed to the tower with the hydraulic cylinder being disposed vertically, said pump including a piston and attached piston rod vertically reciprocable and rotatable in cylinder, said piston rod extending upwardly from the cylinder, and means operatively coupling the boom to the upper end of the piston rod for reciprocating the latter on oscillation of the boom.

2. The combination of claim 1, wherein the axis of the boom pivot means is horizontally displaced from the vertical axis of the head, and wherein the piston rod is aligned with the vertical axis of the head.

3. The combination of claim 2, wherein the boom pivot means is mounted on the head for limited movement relative thereto toward and away from the vertical axis, with said boom pivot means being disposed intermediate the leeward airfoil and the vertical axis in an arrangement such that wind induced drag forces on the airfoils urges the axis of the boom pivot means from the vertical axis, spring means yieldingly urging movement of the axis of the boom pivot toward the vertical axis, whereby the stroke of the piston rod is increased upon the occurrence of higher wind velocity.

4. The combination of claim 3, wherein the spring means is incorporated in a dashpot combination for dampening short term wind and drag induced excursions of the axis of the boom pivot means relative to the vertical axis.

* * * * *